April 14, 1970 — E. F. ROTHEMICH — 3,505,790
DUST COLLECTOR
Filed Oct. 31, 1966 — 2 Sheets-Sheet 1

EDMUND F. ROTHEMICH
INVENTOR.

BY
Norman S. Blodgett

April 14, 1970     E. F. ROTHEMICH     3,505,790
DUST COLLECTOR

Filed Oct. 31, 1966     2 Sheets-Sheet 2

EDMUND F. ROTHEMICH
INVENTOR.

BY
Norman S. Blodgett

United States Patent Office 3,505,790
Patented Apr. 14, 1970

3,505,790
DUST COLLECTOR
Edmund F. Rothemich, Worcester, Mass., assignor to Riley Stoker Corporation, Worcester, Mass., a corporation of Massachusetts
Filed Oct. 31, 1966, Ser. No. 590,657
Int. Cl. B01d 45/00
U.S. Cl. 55—274                                    7 Claims

ABSTRACT OF THE DISCLOSURE

A dust collector arranged to remove dry powdered materials from the products of combustion in a steam generating unit or the like and to weigh the same, the collecting hopper being independently supported from the main body of the dust collector and having electrical strain gages formed into the suspension means to permit automatic weighing of collected dust.

---

In the collection of and removal of dust from gases, there are many chronic problems. This is particularly true in the case of a steam generating unit in which the products of combustion contain flyash and considerable amounts of moisture. When these products of combustion are passed through a dust collector to remove the solid elements carried in the stream of gas, the condensation of water and other liquids combine with the dust and powders to produce a mass which, at times, can stick, clog, and accumulate in such a way as to destroy the effectiveness of the dust collection apparatus. For instance, when a tubular type dust collector is used, the dust falling to the bottom end of the tubes can accumulate on the walls and, eventually, clog the tubes, so that the entire tube becomes filled and, therefore, inoperative. At times it is also necessary to determine to a considerable degree of accuracy the amount of dry solid products of combustion which result from the operation of the steam generating unit. These and other problems experienced with the prior art devices have been obviated in a novel manner by the present invention.

It is, therefore, an outstanding object of the invention to provide a dust collector in which means is provided to assure that dry solid products of combustion do not accumulate in an unwarranted degree.

Another object of this invention is the provision of a dust collector in which means is provided to indicate the accumulation of solid products of combustion.

A further object of the present invention is the provision of a dust collector in which means is provided for measuring the amount of collected materials.

It is another object of the present invention to provide a dust collector having equipment for continuously monitoring the amount of accumulated materials, which apparatus is simple in construction, ruggedly built, and capable of a long life of useful service with a minimum of maintenance.

Another object of the invention is the provision of a dust collector having an alarm to warn the operator when the dust accumulates beyond a predetermined amount.

With these and other objects in view, as will be apparent to those skilled in the art, the invention resides in the combination of parts set forth in the specification and covered by the claims appended hereto.

Figure 1:
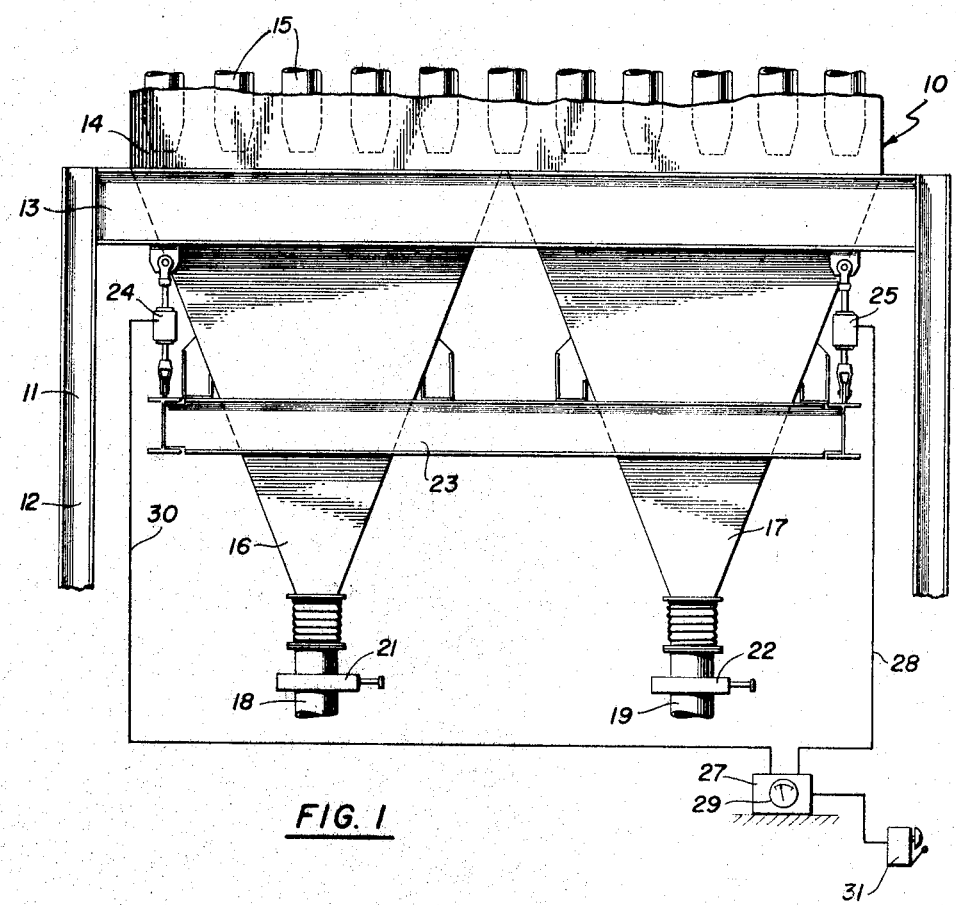
Figure 3:
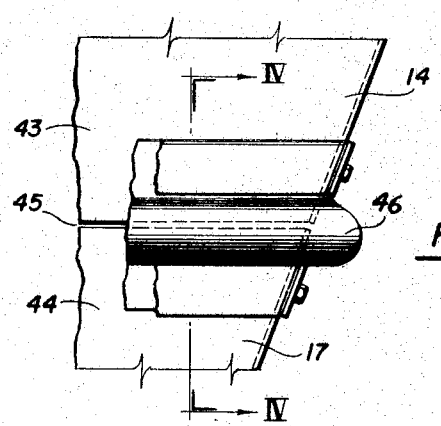
Figure 2:
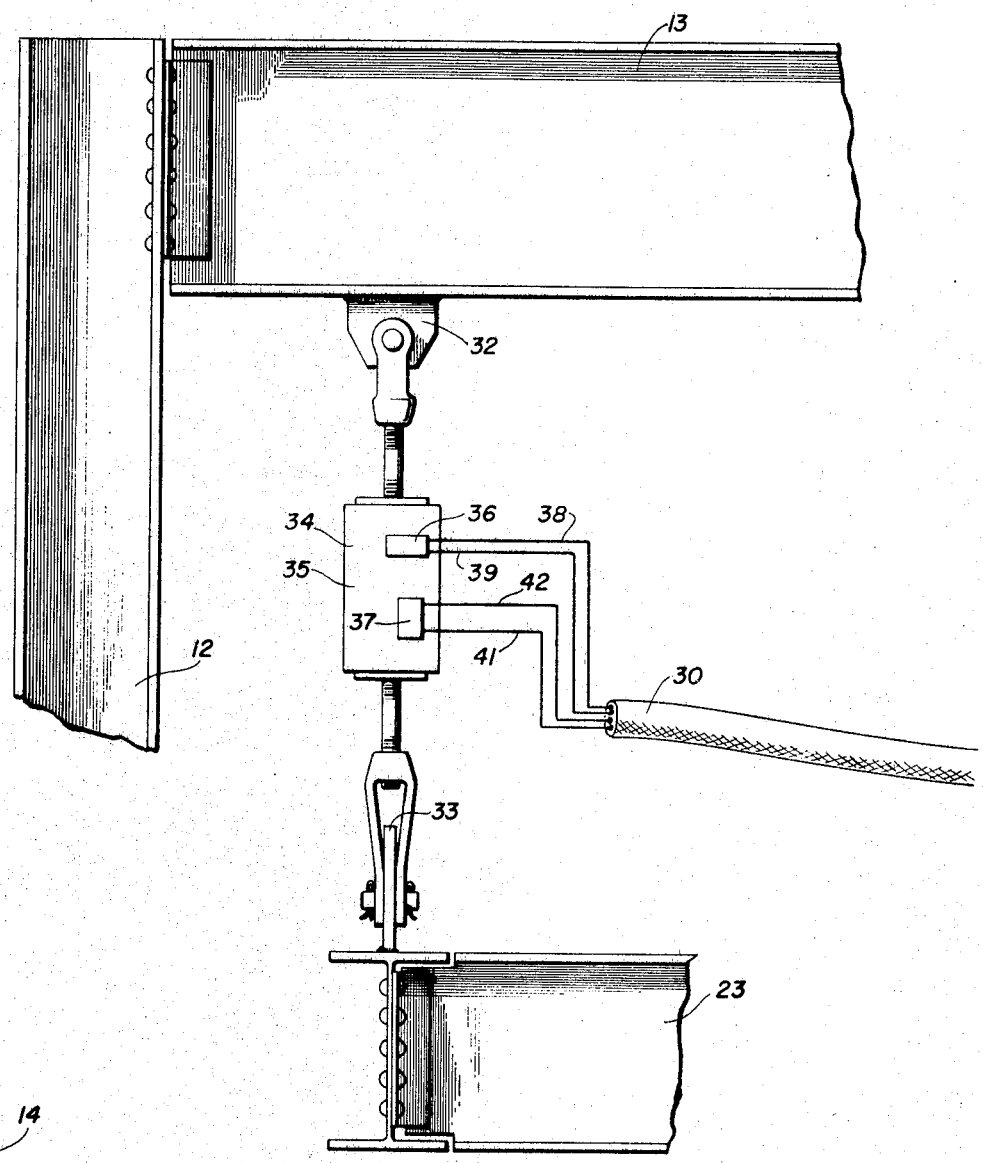
Figure 4:
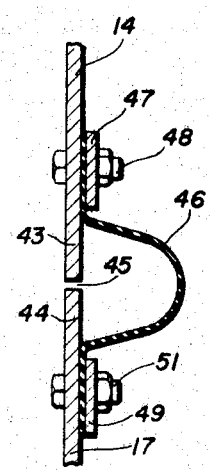

The character of the invention, however, may be best understood by reference to one of its structural forms as illustrated by the accompanying drawings in which:

FIG. 1 is an elevational view of a dust collector embodying the principles of the present invention, FIG. 2 is an enlarged view of a portion of the collector, FIG. 3 is an enlarged view of another portion of the collector, and FIG. 4 is a sectional view of the invention taken on the line IV—IV of FIG. 3.

In general, the invention involves supporting the hopper of a dust collector below the bottom of the dust collector by strain measuring elements and using the signal from these strain elements not only to indicate the weight in the hopper but also to set off an alarm when the weight exceeds a predetermined value.

Referring first to FIG. 1, wherein are best shown the general features of the invention, the dust collector, indicated generally by the reference numeral 10, is shown as consisting of a frame 11 having vertical legs 12 across the top of which are mounted horizontal beams 13 on which are fastened the lower end of a housing 14. Inside of the housing are mounted vertical separator tubes 15 which are of the well-known centrifugal type. The gas and dust enter the top of the pipes and swirl around the axis of the pipe. The dust falls to the bottom end and the clean air is removed from a passage at the side of the tube. Extending downwardly from the housing 14 are hoppers 16 and 17 leading to dust removal pipes 18 and 19 provided, respectively, with slide-type valves 21 and 22. The hopper is in the shape of a pyramid with a rectangular base at the upper end. The lower edge of the housing constitutes an extension of the upper edge of the hopper and is, therefore, inclined upwardly and outwardly. Extending around the hoppers 16 and 17 is a closed band 23 of structural steel. Extending between the band 23 and the horizontal beam 13 of the frame 11 are support means 24 and 25. Leading from the support means 24 is a cable 30 leading to a control box 27. Similarly, a line 28 leads from the support means 25 to the control box 27. It will be understood, of course, that there are two other support means located at the other side of the hoppers 16 and 17, which are not shown in the drawings, thus providing one support means at each corner of the rectangular band 23. The control box 27 is of the conventional type which receives an electric voltage signal from the support means and converts it to suitable electrical values to operate a dial type indicator 29 and an alarm 31.

Referring now to FIG. 2, it can be seen that the support means 24 (which is similar to the support means 17 and to the others) consists of a strap 32 which extends downwardly from the beam 13 and a strap 33 which extends upwardly from the band 23. Joining the ends of the two straps is a lod cell 34. This cell consists generally of a cylindrical main body 35 on which are arranged two strain gages 36 and 37. Each strain gage is of the type having an electrical resistance which varies with the strain put on the gage and they are orientated at right angles to one another. From the gages extend wires 38, 39, 41, and 42 making up the cable 30.

FIGS. 3 and 4 show the details of the connection between the housing 14 and the hopper 17. As is evident in the drawings, each of the hoppers and the lower part of the housing are of inverted pyramidal shape. The housing has a lower edge 43 which lies adjacent the upper edge 44 of the hopper 17, there being a gap 45 between the two. Extending across this gap and between the housing and the hopper is a seal 46 consisting of a strip of flexible material, such as rubber or Teflon, whose upper edge is held in gas-tight relationship with the outer surface of the housing 14 by a plate 47 and a series of bolts 48. Similarly, the lower end of the seal 46 is held against the outer surface of the hopper 17 by a plate 49 and a series of bolts 51. As is evident in FIG. 4, the seal forms a bellows-type arrangement which permits relative motion between the housing and the hopper 17.

The operation of the dust collector will now be readily understood, in view of the above description. The products of combustion from a steam generating unit enter the housing 14 of the dust collector 10 and pass downwardly through the tubes 15. The gas is separated from the dust, the clean gas leaving the tubes and collector housing laterally on its way to the stack of the steam generating unit (not shown), while the dust falls downwardly through the lower end of the tubes 15. This dust passes downwardly through the bottom portion of the housing 14 into the hoppers 16 and 17. The valves 22 and 21 remain shut and the dust accumulates in the hoppers. The weight of the hoppers with the dust contained therein is supported by the band 23 which, in turn, is carried by the support means 24, 25, and the like. As the weight increases, the increase in stress is felt by the strain gages 36 and 37 forming part of the load cells 34 and the change in resistance in the strain gages is indicated to the control box 27 through the cable 30. The control box adds together the indications received through the cables 30 and 28 (and similar cables associated with the other support means) and converts this to a value of voltage summing up the total stress in all of the support means. This is shown on the indicator 29. When the weight, as indicated by the signals arriving from the various cables connected to the load cells, exceeds a predetermined value, the control box 27 causes the alarm 31 to be actuated. This alarm may be a bell, as shown, or a light on a control panel, or something of that kind. When the operator sees the alarm go off, he opens the valves 21 and 22 to allow the dust to flow out of the hoppers into the disposal pipes 18 and 19. By suitable use of the present apparatus, it is also possible for the operator to realize that the normal weight of the accumulation of dust in the hoppers which he would expect within a given period of time has not been collected, which means that dust has accumulated in the tubes 15. Necessary action must then be taken to clean the tubes, such as by washing them out, hammering on them, or the usual methods of cleaning dust collector tubes.

The present apparatus can also be used in test work to determine the amount of dry solid products of combustion coming from the steam generating unit. This, combined with an analysis of the products, can give the operator of the unit an indication of the efficiency of the unit and may indicate to him changes in the operation of the unit which are out of the ordinary. At the same time, the apparatus described does not interfere with the normal operation of the dust collection function. The seal 46 serves very nicely to prevent the escape of gas and so on.

It is obvious that minor changes may be made in the form and construction of the invention without departing from the material spirit thereof.

The invention having been thus described, what is claimed as new and desired to secure by Letter Patent is:

1. A dust collector for use in association with a steam generating unit producing flyash comprising a frame having horizontal beams, a housing having a lower end fixedly mounted on said beams, vertical separator tubes mounted inside said housing for receiving gas and solid particles at the top and discharging the solid particles at the bottom, a support band, means mounting said support band for vertical movement with respect to said horizontal beams and in spaced relationship with respect thereto, said means comprising a load cell for transmitting electrical signals corresponding to the tension between the horizontal beams and the support band, a hopper medially fixedly mounted on said support band at a spaced distance below the top of the hopper, and a bellows-type seal interposed between the top of the hopper and the bottom of said housing.

2. A dust collector according to claim 1 wherein said hopper is in the shape of a pyramid with a rectangular base at the upper end thereof and wherein the lower edge of said housing constitutes an extension of the upper edge of the hopper and extends upwardly and outwardly therefrom.

3. A dust collector according to claim 1 further comprising a plurality of hoppers, each having the shape of a pyramid with a rectangular base at the upper end thereof.

4. A dust collector according to claim 1 wherein said bellows-type seal comprises a flexible seal strip having its upper edge fastened in gas tight relationship to the lower edge of said bottom of said housing and having its lower edge fastened in gas tight relationship to the upper edge of the top of the hopper.

5. A dust collector according to claim 1 wherein said means mounting said support band for vertical movement with respect to said horizontal beams and in spaced relationship with respect thereto comprises a strap fastened to said horizontal beams and extending downwardly therefrom, a strap fastened to said support band and extending upwardly therefrom, and said load cell joining the adjacent ends of the straps.

6. A dust collector according to claim 5 further comprising indicator means responsive to said electrical signals transmitted by said load cell.

7. A dust collector for use in association with a steam generating unit producing flyash comprising a frame having horizontal beams, a housing having a lower end fixedly mounted on said beams, vertical separator tubes mounted inside said housing for receiving gas and solid particles at the top and discharging solid particles at the bottom, a rectangularly shaped closed support band, means mounting said support band for vertical movement with respect to said horizontal beams and in spaced relationship with respect thereto, a strap fastened to each corner of said support band and extending upwardly therefrom, and corresponding straps fastened to said horizontal beams and extending downwardly therefrom, a load cell joining adjacent ends of said straps for transmitting electrical signals corresponding to the tension between the horizontal beam and the support band, indicator means responsive to said electrical signals transmitted by said load cell, a plurality of hoppers medially fixedly mounted on said support band at a spaced distance below the top of the hoppers, said hoppers being in the shape of a pyramid with a rectangular base at the upper end thereof, the lower edge of said housing constituting an extension of the upper edges of the hoppers, a bellows-type seal interposed between the top of the hoppers and the bottom of said housing, said bellows-type seal comprising a flexible seal strip having its upper edge fastened in gas tight relationship to the lower edge of said bottom of said housing and having its lower edge fastened in gas tight relationship to the upper edge of the hoppers.

References Cited

UNITED STATES PATENTS

| | | | |
|---|---|---|---|
| 2,381,505 | 8/1945 | Lindholm | 222—56 |
| 2,868,535 | 1/1959 | Ruge | 177—253 X |
| 2,893,602 | 7/1959 | Barber et al. | 177—253 X |
| 3,059,666 | 10/1962 | Lodge. | |
| 3,125,176 | 3/1964 | Bale et al. | 177—211 X |
| 3,173,506 | 3/1965 | Clamp | 177—211 |

(Other references on following page)

UNITED STATES PATENTS

| | | | |
|---|---|---|---|
| 3,199,619 | 8/1965 | Hathaway | 177—211 X |
| 3,225,963 | 12/1965 | Arpajian | 222—56 X |
| 1,170,438 | 2/1916 | Fahrney | 55—399 X |
| 1,383,984 | 7/1921 | Clark | 55—393 X |
| 1,449,857 | 3/1923 | Hay | 55—215 |
| 1,536,592 | 5/1925 | Klug | 55—393 X |
| 2,467,752 | 4/1949 | Howe. | |
| 2,534,702 | 12/1950 | Driessen | 55—428 X |
| 2,572,862 | 10/1951 | Israel | 177—144 X |
| 2,616,683 | 11/1952 | Le Fevere | 177—211 |
| 2,678,110 | 5/1954 | Madsen | 55—426 X |
| 2,761,670 | 9/1956 | Fouretier | 177—211 |
| 2,815,480 | 12/1957 | Ruge | 177—211 X |
| 2,868,491 | 1/1959 | Thorsson et al. | 177—211 X |
| 3,227,231 | 1/1966 | Parker | 177—211 X |
| 3,307,646 | 3/1967 | Hage | 177—60 X |

FOREIGN PATENTS

| | | |
|---|---|---|
| 468,718 | 10/1950 | Canada. |
| 932,337 | 8/1955 | Germany. |
| 42,636 | 2/1938 | Netherlands. |

DENNIS E. TALBERT, JR., Primary Examiner

U.S. Cl. X.R.

55—345, 358, 385, 432, 466; 177—211, 253; 222—56, 162